US010360185B2

(12) United States Patent
Jerrard-Dunne et al.

(10) Patent No.: US 10,360,185 B2
(45) Date of Patent: *Jul. 23, 2019

(54) LOG FILE ANALYSIS TO LOCATE ANOMALIES

(71) Applicant: International Business Machines Corporation, Armonk, NY (US)

(72) Inventors: Stanley K. Jerrard-Dunne, Dublin (IE); Alice-Maria Marascu, Dublin (IE); Conor D. McGrath, Dublin (IE)

(73) Assignee: International Business Machines Corporation, Armonk, NY (US)

(*) Notice: Subject to any disclaimer, the term of this patent is extended or adjusted under 35 U.S.C. 154(b) by 17 days.

This patent is subject to a terminal disclaimer.

(21) Appl. No.: 15/140,722

(22) Filed: Apr. 28, 2016

(65) Prior Publication Data

US 2016/0378780 A1 Dec. 29, 2016

Related U.S. Application Data

(63) Continuation of application No. 14/748,969, filed on Jun. 24, 2015.

(51) Int. Cl.
*G06F 17/30* (2006.01)
*G06F 16/174* (2019.01)
*G06F 16/11* (2019.01)
*G06F 16/17* (2019.01)
*G06F 16/18* (2019.01)
*G06F 16/23* (2019.01)

(52) U.S. Cl.
CPC ........ *G06F 16/1748* (2019.01); *G06F 16/122* (2019.01); *G06F 16/1734* (2019.01); *G06F 16/1805* (2019.01); *G06F 16/2365* (2019.01)

(58) Field of Classification Search
CPC ........ G06F 17/30156; G06F 17/30082; G06F 17/30063
See application file for complete search history.

(56) References Cited

U.S. PATENT DOCUMENTS

| 7,668,843 | B2 | 2/2010 | Ertoz et al. |
| 8,433,702 | B1* | 4/2013 | Carrino ............ G06F 17/30964 707/717 |
| 8,495,737 | B2 | 7/2013 | Sinha et al. |
| 9,098,626 | B2* | 8/2015 | Gajula ................ G06F 11/3476 |
| 9,104,573 | B1* | 8/2015 | Shanmugasundaram .................... G06F 11/0709 |

(Continued)

OTHER PUBLICATIONS

Author: Paul E. Black, Ratcliff/Obershelp pattern recognition, National Institutes of Standards and Technology, Dec. 17, 2004.*

(Continued)

*Primary Examiner* — Usmaan Saeed
*Assistant Examiner* — David M Nafziger
(74) *Attorney, Agent, or Firm* — Robert C. Bunker (57) ABSTRACT

Method and system are provided for log file analysis to locate anomalies. The method includes comparing each line of a log file with other lines of the log file to determine duplicate and similar lines of the log file. The step of comparing includes: locating two or more duplicate lines of the log file; and locating two or more similar lines of the log file using pattern matching of a string of each of the lines of the log file. The method also includes outputting a line of the log file as a line that is a potential anomaly if it is rejected as a duplicate or a similar line.

8 Claims, 7 Drawing Sheets

(56) References Cited

U.S. PATENT DOCUMENTS

| | | | |
|---|---|---|---|
| 9,110,602 B2* | 8/2015 | Vijayan | G06F 3/0652 |
| 9,420,068 B1* | 8/2016 | Johnson | G06F 17/30994 |
| 2003/0236766 A1* | 12/2003 | Fortuna | G06F 11/0721 |
| 2005/0138483 A1* | 6/2005 | Hatonen | G06F 11/3466 714/45 |
| 2006/0184529 A1* | 8/2006 | Berg | G06F 11/0709 |
| 2006/0265323 A1* | 11/2006 | Winter | G06Q 20/40 705/37 |
| 2008/0065617 A1* | 3/2008 | Burke | G06F 17/30646 |
| 2011/0016091 A1* | 1/2011 | Prahlad | G06F 11/1453 707/654 |
| 2011/0131453 A1* | 6/2011 | Fernandess | G06F 11/079 714/37 |
| 2011/0320865 A1* | 12/2011 | Jain | G06F 11/1088 714/6.22 |
| 2012/0041575 A1 | 2/2012 | Maeda et al. | |
| 2013/0117246 A1* | 5/2013 | Cabaniols | G06F 17/2211 707/697 |
| 2014/0053025 A1 | 2/2014 | Marvasti et al. | |
| 2014/0096249 A1 | 4/2014 | Dupont et al. | |
| 2014/0324865 A1* | 10/2014 | Mizutani | G06F 11/0703 707/737 |
| 2015/0120656 A1* | 4/2015 | Rannnarayanan | G06F 17/30129 707/616 |
| 2015/0120682 A1* | 4/2015 | Crowther | G06F 17/30156 707/692 |
| 2015/0269211 A1* | 9/2015 | da Silva | G06F 17/30598 707/725 |
| 2015/0317327 A1* | 11/2015 | He | G06F 17/30327 707/693 |
| 2016/0162364 A1* | 6/2016 | Mutha | G06F 3/0608 707/645 |
| 2016/0188882 A1* | 6/2016 | Mahrous | G06F 21/577 726/25 |
| 2016/0210181 A1* | 7/2016 | Kikuchi | G06F 11/0751 |
| 2016/0378781 A1 | 12/2016 | Jerrard-Dunne et al. | |
| 2017/0013003 A1* | 1/2017 | Samuni | G06F 11/00 |

OTHER PUBLICATIONS

Appendix P—List of IBM Patents or Patent Applications Treated as Related, 2 Pages.

Frei, Adrian; "Histogram Matrix: Log File Visualization for Anomaly Detection"; The Third International Conference on Availability, Reliability and Security; © 2008 IEEE; pp. 610-617.

Ratclif, John W.; "Pattern Matching: the Gestalt Approach"; Dr.Dobb's; Jul. 1, 1988; Printed on: Jun. 15, 2015; © 2015, UBM Tech; pp. 1-11; <http://www.drdobbs.com/database/pattern-matching-the-gestalt-approach/184407970?pgno=5>.

"Anomaly Detection"; Logentries; Printed on: Jun. 15, 2015; ©2015 logentries.com, inc.; pp. 1-5; <https://logentries.com/doc/anomaly/>.

"Demo Log import"; PIWIK; Printed on: Jun. 15, 2015; pp. 1-6; <http://demo-log-analytics.piwik.org/index.php?module=CoreHome&action=index&idSite=1&period=day&date=yesterday#/module=Dashboard&action=embeddedIndex&idSite=1&period=day&date=yesterday&idDashboard=1>.

"Sawmill—Universal log file and reporting"; Sawmill; Printed on: Jun. 15, 2015; © 2015, Flowerfire; pp. 1-3; <https://www.sawmill.net/index.html>.

"Server Monitoring Software"; Power Admin LLC; Printed on: Jun. 15, 2015; © 2002-2015 ,Power Admin LLCpp. 1-5; <http://www.poweradmin.com/servermonitor/?F=L&source=adwords&campaign=sm-search&gclid=CP381qyw6sACFfMgtAodyyYAxg>.

"Web Analytics Software—Deep Log Analyzer"; Deep Software; Printed on: Jun. 15, 2015; © 2004-2015, Deep Software Inc.; pp. 1-2; <http://www.deep-software.com/>.

Jerrard-Dunne et al., "Log File Analysis to Locate Anomalies", U.S. Appl. No. 14/748,969, filed Jun. 24, 2015, 24 pages.

Atkins, "Swatch(1): Simple Watcher," Linux Man Page, p. 1-5, Section 1, https://linux.die.net/man/1/swatch, Accessed on Oct. 10, 2018.

Rouillard, "Real-time Log File Analysis Using the Simple Event Correlator (SEC)," 2004 LISA XVIII, Nov. 14-19, 2004, p. 133-150, Atlanta, GA.

* cited by examiner

LOG FILE ANALYSIS TO LOCATE ANOMALIES

BACKGROUND

The present invention relates to analysis of log files, and more specifically, to analysis of log files to locate anomalies.

In the running of a very busy cloud service due to the very large volumes of transactions, system logs on servers grow very rapidly and to very large sizes.

If an incident occurs and it is necessary to diagnose an issue where a server is crashing, a request may be made to examine log files to "find anything unusual". Taking one example, a log file may have ~9 million lines of text and 380 mb size. Clearly eyeballing this file for unusual activity is not humanly possible.

Spam detection algorithms work on the principal that spam follows some regular pattern, and any thing that is not spam looks unusual to the spam detector and therefore is considered not-spam. The same principle applied in reverse on log files could be used to filter out the common activity leaving the unusual behind.

Similarity algorithms commonly used for spam detection such as the Sorenson index, also known as Dice's coefficient were found to be quite inefficient and not very effective in achieving the goal, this was largely due to the relatively small amount of content in a typical log message.

Therefore, there is a need in the art to address the aforementioned problems.

BRIEF SUMMARY OF THE INVENTION

According to a first aspect of the present invention there is provided a computer-implemented method for log file analysis to locate anomalies, comprising: comparing each line of a log file with other lines of the log file to determine duplicate and similar lines of the log file, including: locating two or more duplicate lines of the log file; and locating two or more similar lines of the log file using pattern matching of a string of each of the lines of the log file; and outputting a line of a log file as a line that is a potential anomaly if it is rejected as a duplicate or a similar line.

In one embodiment of the first aspect of the present invention, the method includes: inputting the log file to a memory file; and wherein comparing each line of the log file with other lines of the log file to determine duplicate and similar lines, includes sorting and comparing the lines of the log file in the memory file using an iterative method; wherein locating two or more duplicate lines of the log file, includes eliminating the duplicated lines from the memory file when a number of duplicated lines is above a threshold number; and wherein locating two or more similar lines of the log file using pattern matching of a string of each of the lines of the log file, includes eliminating the similar lines from the memory file when a number of similar lines is above a threshold number; and wherein outputting a line of a log file as a line that is a potential anomaly outputs remaining lines of the log file in the memory file when no more eliminations are made in the iterations of the iterative method.

In another embodiment of the first aspect of the present invention, the method includes: creating a reference bucket of a set of lines of the log file, wherein the log file is being dynamically written; wherein comparing each line of the log file with other lines of the log file to determine duplicate and similar lines of the log file, includes comparing a currently written line of the log file with the set of lines of the log file in the reference bucket; adding a currently written line which is one of a duplicate line and a similar line to the reference bucket dynamically; and wherein outputting a line of the log file as a line that is a potential anomaly, includes outputting a line that is a potential anomaly as it is written by rejecting the line from the reference bucket.

According to a second aspect of the present invention there is provided a system for log file analysis to locate anomalies, comprising: at least one processor which executes a comparing component for comparing each line of a log file with other lines of the log file to determine duplicate and similar lines of the log file, wherein the log file is stored in a memory file in memory storage or the log file is dynamically written storing currently written lines to a memory file in memory storage; wherein the comparing component includes: a duplicate locating component for locating two or more duplicate lines of the log file which match; and a similar line locating component for locating two or more similar lines of the log file using pattern matching of a string of each of the lines of the log file; and an output component for outputting a line of the log file as a line that is a potential anomaly if it is rejected as a duplicate or a similar line.

In one embodiment of the second aspect of the present invention, the system is an existing log file analysis system and includes: a log file input component for inputting a log file to memory; and wherein the comparing component executes to compare the lines of the log file in the memory file using an iterative method; and wherein the duplicate locating component includes a duplicate eliminating component for eliminating the duplicated lines from the memory file when a number of duplicated lines is above a threshold number; and wherein the similar line locating component includes a similar line eliminating component for eliminating the similar lines when a number of similar lines is above a threshold number; and wherein the output component executes to output remaining lines of the log file in the memory file when no more eliminations are made in the iterations of the iterative method.

In another embodiment of the second aspect of the present invention, the system is a dynamic log file analysis system and includes: a reference bucket creating component for creating a reference bucket of a set of lines of a log file, wherein the log file is being dynamically written storing currently written lines to a memory file in memory storage; and wherein the comparing component compares a currently written line of the log file with the set of lines of the log file in the reference bucket; and a line adding component for adding a currently written line which is one of a duplicate line and a similar line to the reference bucket dynamically; and wherein the output component outputs a line that is a potential anomaly as it is written by rejecting the line from the reference bucket.

According to a third aspect of the present invention there is provided a computer program product for log file analysis to locate anomalies, the computer program product comprising a computer readable storage medium having program instructions embodied therewith, the program instructions executable by a processor to cause the processor to: compare each line of a log file with other lines of the log file to determine duplicate and similar lines of the log file, including: locating two or more duplicate lines of the log file; and locating two or more similar lines of the log file using pattern matching of a string of each of the lines of the log file; and output a line of the log file as a line that is a potential anomaly if it is rejected as a duplicate or a similar line.

BRIEF DESCRIPTION OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings.

Preferred embodiments of the present invention will now be described, by way of example only, with reference to the following drawings in which.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

The described method and system analyze very large log files, producing a summary output including any "unusual" or anomaly entries that are present in the file.

The described method identifies unusual entries within an information stream such as a log file by comparing lines of the information stream.

Two implementations of the method and system are described. A first embodiment examines an existing log file, which is loaded into a memory file. A second embodiment examines lines of a log file as they are being dynamically written by comparing the lines to some of the already written lines of the log file, which are stored in a reference bucket or file.

In the first embodiment, the method includes examining each line in the log file with respect to the other lines within the file and eliminating duplicated lines and similar lines in a series of rounds until no eliminable entries are found. The resulting remaining lines are determined to be lines that are potential anomalies.

In the second embodiment, the method involves dynamically analyzing a live stream or log feed and providing a real time alert on occurrence of anomalies by creating a reference bucket set for identifying unusual lines and refining the reference set based on new data.

Figure 1:
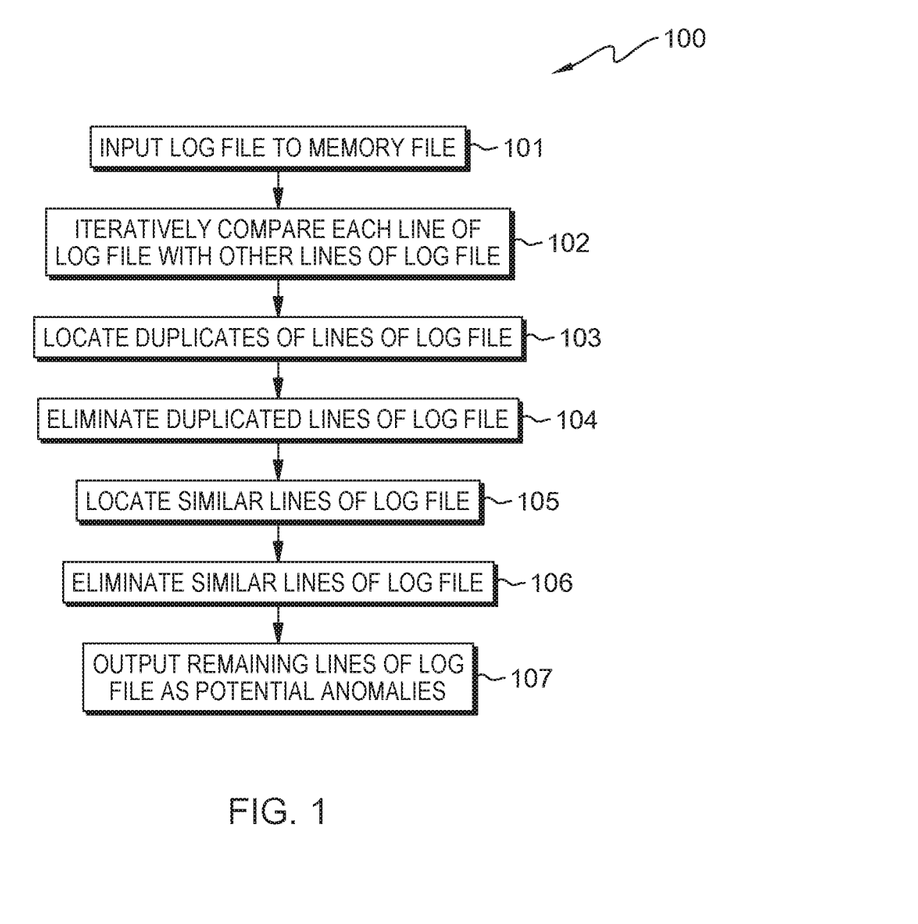
FIG. 1 is a flow diagram of a first embodiment of a method in accordance with the present invention.

Referring to FIG. 1, a flow diagram 100 shows the first embodiment of the described method. The embodiment of FIG. 1 locates potential anomalies in a static log file in which the file is input 101 to a memory file in a memory storage and processed using the described method.

The method iteratively compares 102 each line of the log file with the other lines in the log file.

The comparing step 102 may include locating 103 duplicates of lines of the log file that match and eliminating 104 duplicated lines when the number of matching lines is above a threshold number. Locating duplicates of lines may locate two or more lines that match and are therefore considered duplicates. A set of matching lines may be stored until the number of matching lines reaches the threshold number of lines, at which point the duplicated lines may be eliminated from the stored memory file.

The comparing step 102 may also include locating 105 similar lines of the log file using pattern matching of the strings of the lines of the log file and eliminating 106 similar lines when the number of similar lines is above a threshold number. Locating similar lines may locate two or more similar lines that are pattern matched to a defined similarity. A set of similar lines may be stored until the number of similar lines reaches the threshold number of lines, at which point the similar lines may be eliminated from the stored memory file.

Various methods of pattern matching of the strings of each line may be used to determine if there are similarities between two strings. An example includes a gestalt approach such as Ratcliff/Obershelp.

Some log files have common elements prefixing or suffixing each entry, for example the data and time the entry was made. By allowing the configuration of a suffix and a prefix regular expression pattern, those elements of the entry can be removed and thus ignored when finding duplicates or similar entries.

The method may include outputting 107 lines of a log file as lines that are potential anomalies if, at the end of the iterations, the lines are not eliminated as duplicates or similar lines. The output may include displaying the lines that are potential anomalies to a user, triggering an event to highlight or investigate such lines, generating a report listing the lines, etc.

A specific example of the embodiment outlined in FIG. 1 is given below with reference to FIG. 3.

Figure 2:
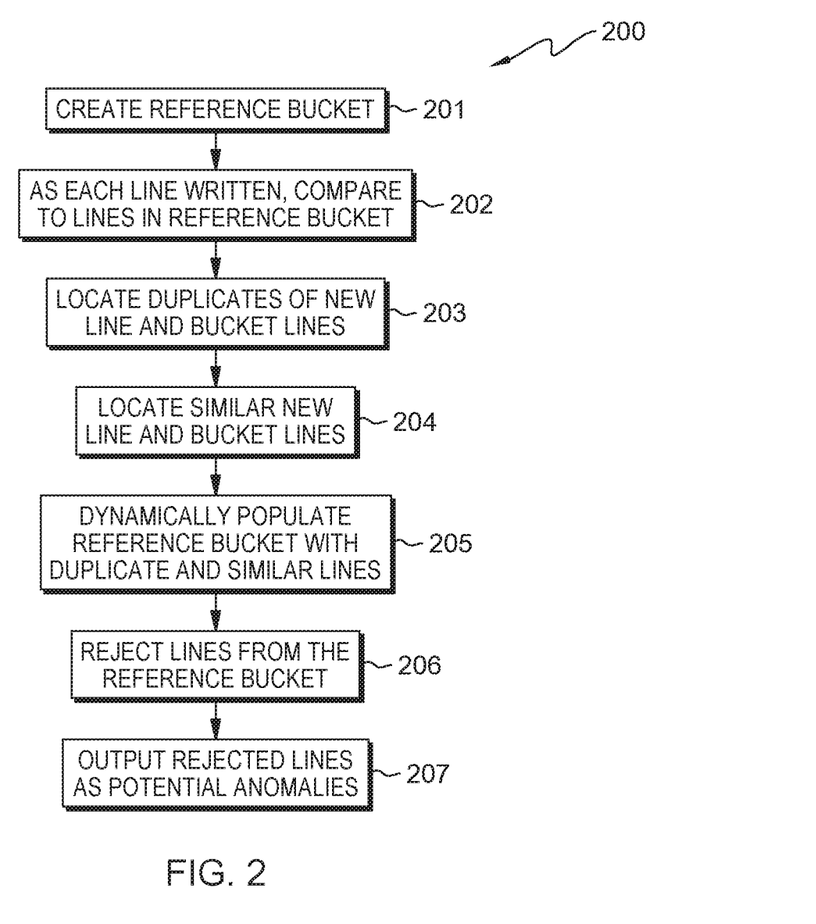
FIG. 2 is a flow diagram of second embodiment of a method in accordance with the present invention.

Referring to FIG. 2, a flow diagram 200 shows the second embodiment of the described method, which locates lines with potential anomalies in a dynamic log file as lines of the log file are being written.

A reference bucket or file is created 201 in memory including a set of lines of a log file. This may have a starting size of a sample set of lines and may then be adjusted as the log file is being written and lines are added to the reference bucket.

As each line of the log file is written 202, the method includes comparing a currently written line of the log file with a set of lines in the reference bucket.

The comparing step 202 may include locating 203 duplicates of the currently written line of the log file and lines in the reference bucket. Locating duplicates may locate a line in the reference bucket, which matches the currently written line.

The comparing step 202 may also include locating 204 similar lines between the currently written line of the log file and lines in the reference bucket using pattern matching of the strings of the lines of the log file. Locating similar lines may locate two or more lines that are pattern matched by their text or character string to a defined degree of similarity. Various methods of pattern matching of the strings of each line may be used to determine if there are similarities between two strings. Examples include prefix and suffix matching and/or a gestalt approach such as Ratcliff/Obershelp.

Some log files have common elements prefixing or suffixing each entry, for example the data and time the entry was made. By allowing the configuration of a suffix and a prefix regular expression pattern, those elements of the entry can be removed and thus ignored when finding duplicates or similar entries.

The reference bucket may be populated by dynamically adding 205 currently written lines, which are duplicate or similar lines to lines in the reference bucket. A count of a duplicate or a similar set of lines may be incremented as a currently written line is matched. If a currently written line is not a duplicate or similar line to any of the lines in the reference bucket it is rejected from the reference bucket 206.

If the reference bucket reaches a predefined size, the method may also include rejecting and labeling as a potential anomaly a line having a lowest count if the count is below a threshold.

The method further includes outputting 207 a rejected line of a log file as a potential anomaly when rejected from the reference bucket. The reference bucket therefore holds sets of duplicate and similar lines and lines are rejected from the bucket if they are different to the reference bucket lines suggesting that a rejected line is an anomaly. A specific example of this second embodiment outlined in FIG. 2 is given below with reference to FIG. 4.

Figure 3:
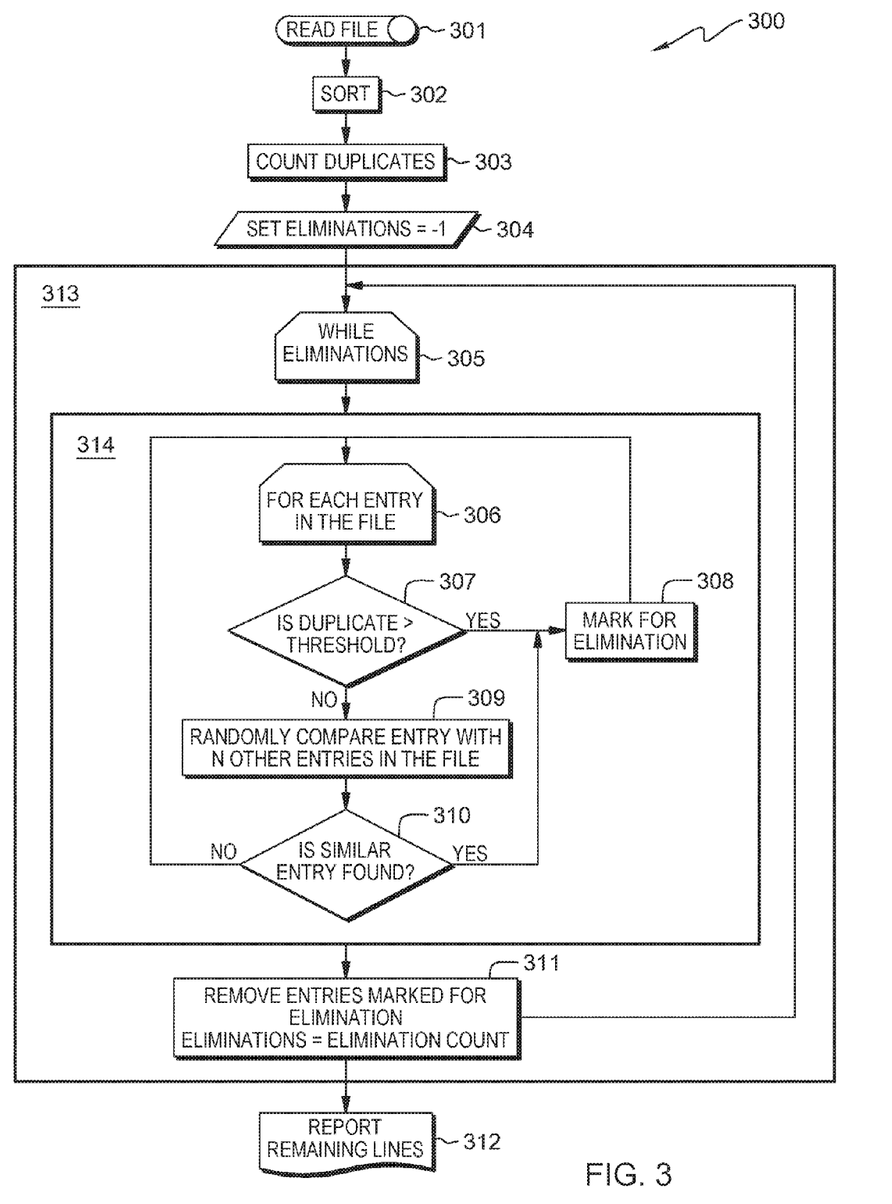
FIG. 3 is a flow diagram of a detailed example of the first embodiment of FIG. 1.

Referring to FIG. 3, a specific embodiment is described of the method of the aspect of FIG. 1 which locates potential anomalies in a static log file in which the file is input to a memory and processed using the described method.

The basic principle of the algorithm is to examine each line in the log file with respect to the other lines in the file, eliminating those lines that are found to be duplicated or similar to other lines in the file, in a series of rounds until no more eliminable entries can be found. The resulting remaining lines are considered to be the potential anomalies.

The flow diagram 300 of FIG. 3 describes a detailed embodiment of this method. The method reads 301 a file into memory.

The file is sorted 302 in memory for the purpose of counting duplicates. For each entry record, the number of times it is duplicated is counted 303.

The elimination count is set 304 at −1. Box 313 determines if there are still eliminations to be made. If there are eliminations 305 to be made, then the method in box 314 is iterated.

The method in box 314 includes the following steps.

For each entry in the file 306, if the duplicate count 307 is greater than d, where d is a configurable threshold, mark 308 the entry for elimination.

If the entry does not have a duplicate count 307 above d, using a similarity algorithm, compare 309 the entry with r, where r is a configurable threshold, other random entries; if 310 similarity >s, where s is a configurable threshold, mark 308 the entry for elimination.

Remove 311 all entries that are marked for elimination. If the count of removed entries is >0, loop back to 305 as this indicates there are more eliminations possible.

If the count of removed entries is 0, output 312 the remaining entries.

The method of box 314 may be run with multiple processor threads, each thread processing a designated fragment of the remaining entries. For example, in one implementation six threads may be used, to maximize the efficiency of the process while running on a laptop with eight cores available.

In addition to the first embodiment of static file analysis, the second embodiment is described in more detail to allow for the analysis of a live log feed, providing for the possibility of real time alerting when anomalies occur. Also some tuning is described that could be applied where the general format of log files acts to counter the effectiveness of the algorithm described.

Figure 4:
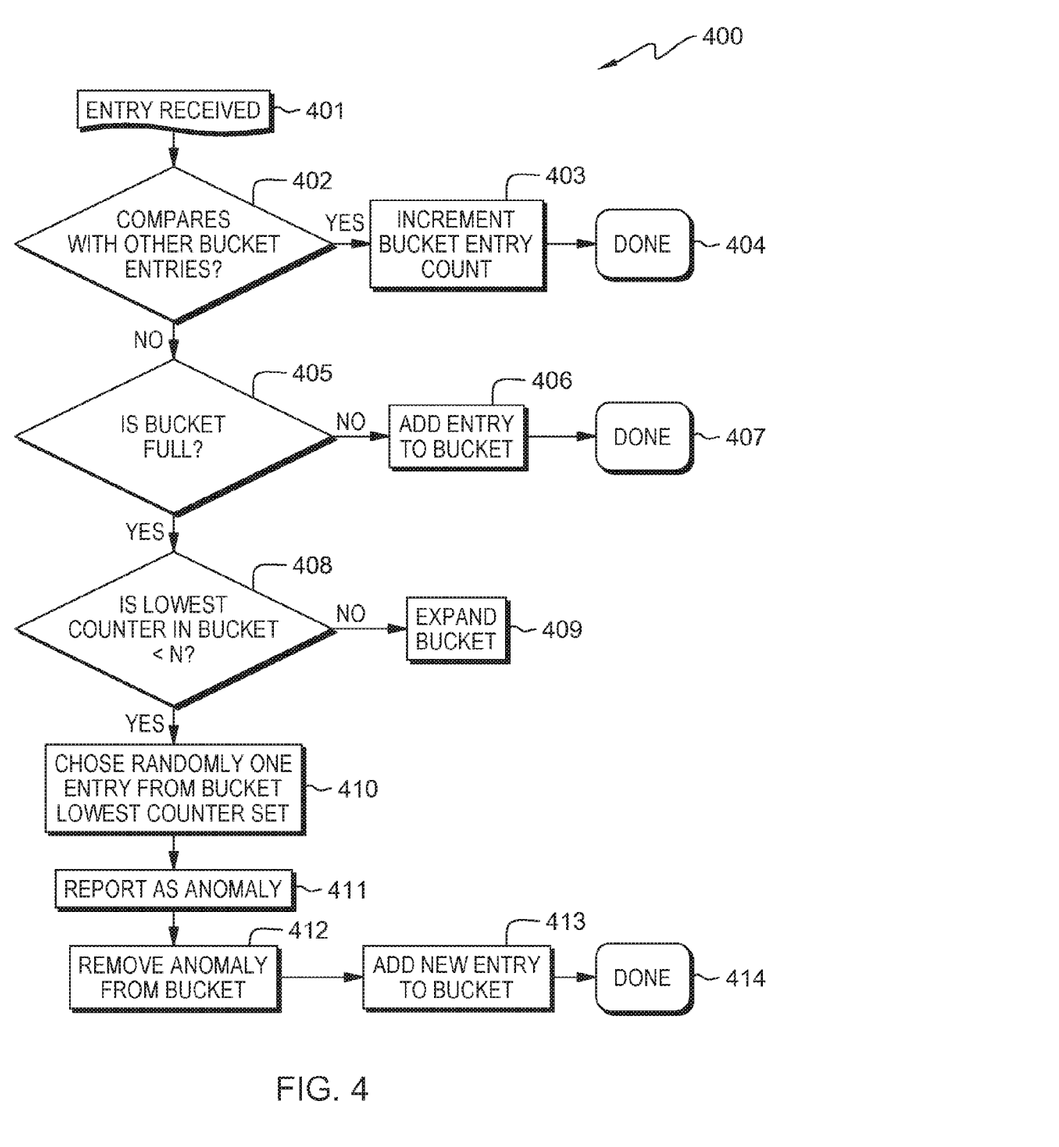
FIG. 4 is a flow diagram of a detailed example of the second embodiment of FIG. 2.

Referring to FIG. 4, the flow diagram 400 provides a detailed implementation of the second embodiment FIG. 2 is described, which locates potential anomalies in a dynamic log file as lines of the log file are being written.

This method carries out a real time log analysis to detect anomalies in real time as they occur. A reference bucket of a starting size is created of approximately 100 log lines. Multiple lines which are duplicates or similar may be stored as an entry with an entry counter. This initial reference bucket size may be configurable.

As each log entry occurs 401 as a currently written line, it is compared 402 for duplication or similarity with the lines in the entries in the reference bucket. Where a duplicate or a similar line is found in the reference bucket, that reference bucket entry counter is incremented 403 and the method ends 404.

If a duplicate or a similar line is not found, it is determined 405 if the bucket is full. If it is not full, the currently written log line is added 406 to the reference bucket and the method ends 407.

If the reference bucket is full, it is determined if the lowest entry counter is less than n, a configurable threshold, say 10 for example. If the lowest entry counter is not less than n 408, then the reference bucket is expanded 409 to hold the currently written line.

If the reference bucket is full, and the lowest entry counter is less than n 408, one random entry from the set of entries with the lowest count in the reference bucket is chosen 410 and reported 411 as a potential anomaly. The entry that is the potential anomaly is removed 412 from the bucket and replaced 413 with the added currently written line as a new entry and the method ends 414.

When the method ends and logs stop feeding, those entries remaining in the bucket with a low hit count may also be reported as potential anomalies.

Over time the bucket populates with the most common entry patterns and ejects the potential anomalies as and when they occur.

The frequency of entry growth in the bucket over time can be recorded and used to determine changes in logging patterns.

As the bucket grows there is clearly an impact on performance so a maximum size limit may be configured.

Pattern matching is used in both embodiments to determine lines which have a degree of similarity. The text or character strings of the lines may be used to compare lines. The pattern matching may take various forms.

In a preferred embodiment, a modified implementation of the gestalt approach to pattern matching is used. Ratcliff/Obershelp pattern-matching algorithm uses the gestalt approach.

The Ratcliff/Obershelp pattern-matching algorithm is as a wild-card search that does not require wild cards. Instead, the algorithm creates its own wildcards, based on the closest matches found between the strings.

Specifically, the algorithm works by examining two strings passed to it and locating the largest group of characters in common. The algorithm uses this group of characters as an anchor between the two strings. The algorithm then places any group of characters found to the left or the right of this anchor on a stack for further examination. This procedure is repeated for all sub-strings on the stack until there is nothing left to examine.

The algorithm calculates the score returned as twice the number of characters found in common divided by the total number of characters in the two strings; the score is returned as an integer, reflecting a percentage match.

For example, comparing the similarity between the word 'Pennsylvania' and a mis-spelling as 'Pencilvaneya.' The largest common group of characters that the algorithm would find is 'Ivan.' The two sub-groups remaining to the left are 'Pennsy' and 'Penci,' and to the right are 'ia' and 'eya.' The algorithm places both of these string sections on the stack to be examined, and advances the current score to eight, two times the number of characters found in common. The substrings 'ia' and 'eya' are next to come off of the stack and are then examined. The algorithm finds one character in common: a. The score is advanced to ten. The substrings to the left—'i' and 'ey'—are placed on the stack, but then are immediately removed and determined to contain no character in common. Next, the algorithm pulls 'Pennsy' and 'Penci' off of the stack. The largest common substring found is 'Pen.' The algorithm advances the score by 6 so that it is now 16. There is nothing to the left of 'Pen,' but to the right are the substrings 'nsy' and 'ci,' which are pushed onto the stack. When the algorithm pulls off 'nsy' and 'ci' next, it finds no characters in common. The stack is now empty and the algorithm ready to return the similarity value found. There was a score of 16 out of a total of 24. This result means that the two strings were 67 percent alike.

An alternative similarity scoring method may also be used such as the Sorenson index.

Figure 5A:
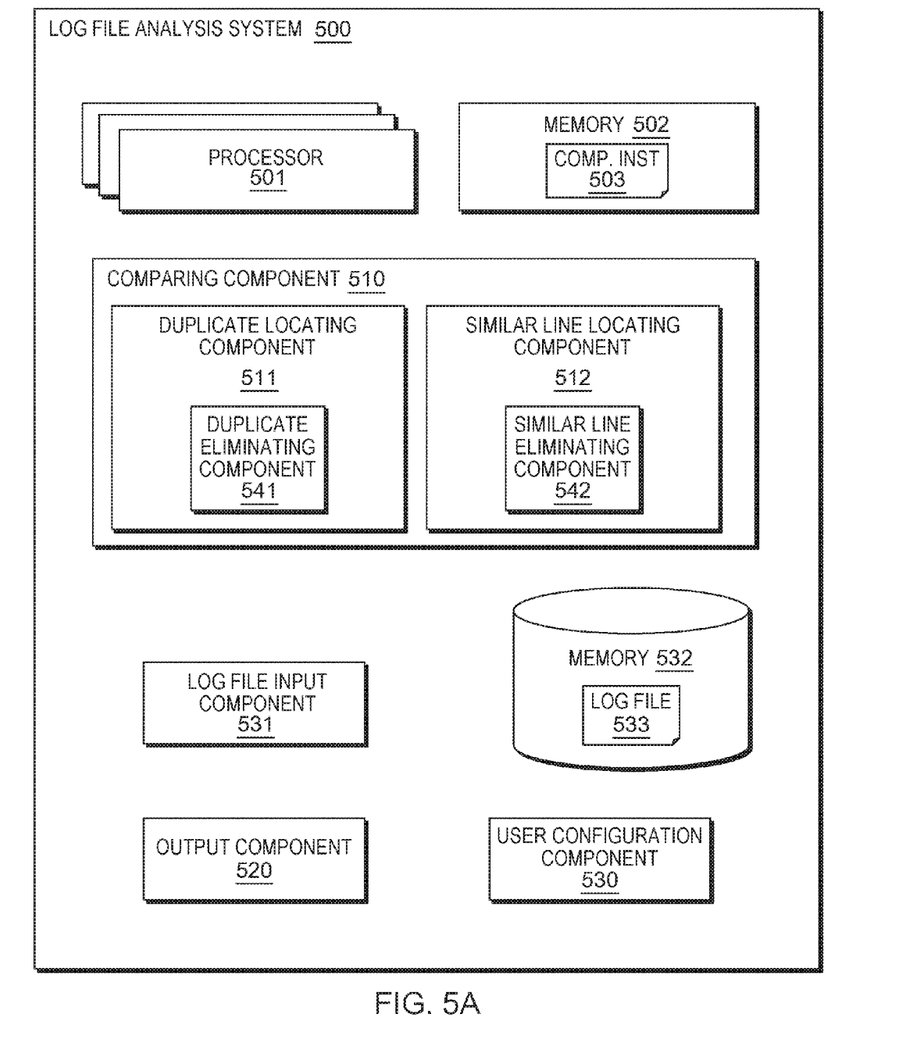
FIG. 5A is block diagram of a first embodiment of a system in accordance with the present invention.
Figure 5B:
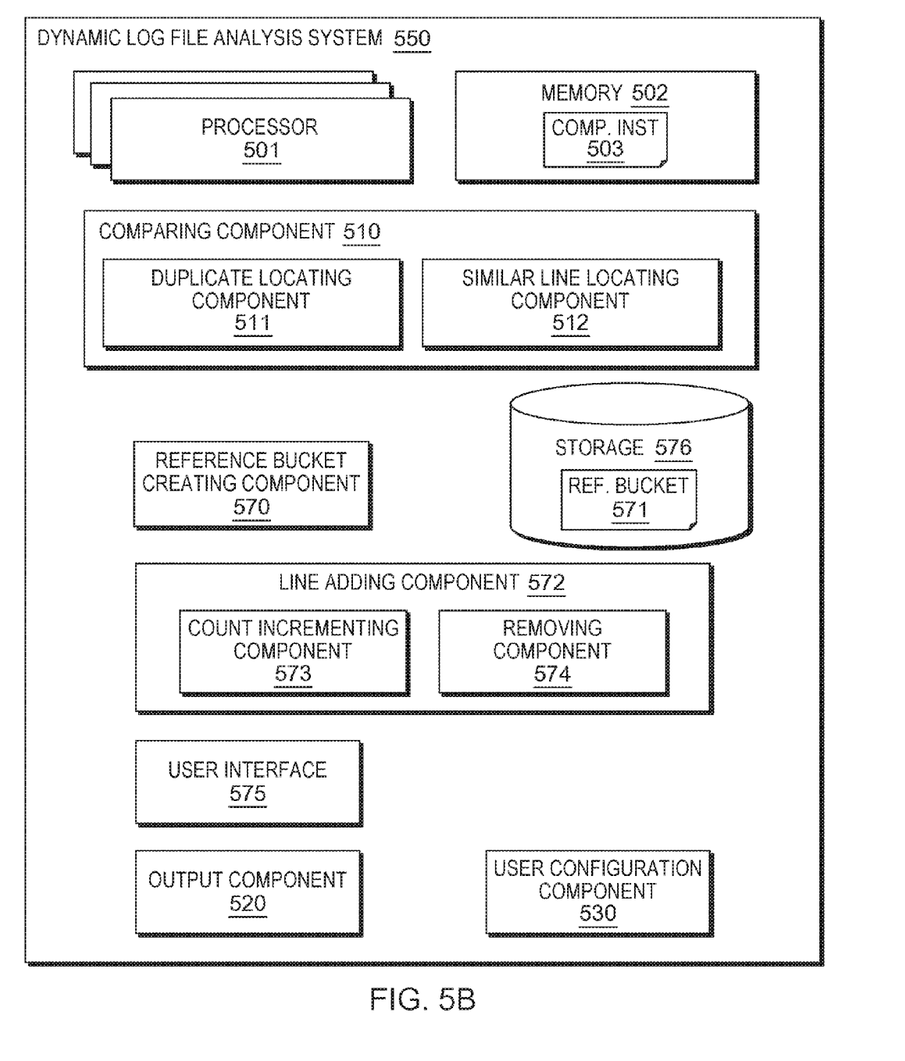
FIG. 5B is block diagram of a second embodiment of a system in accordance with the present invention.

Referring to FIGS. 5A and 5B, block diagrams show systems according to the two described embodiments. Common components across both embodiments have the same reference numbers.

A log file analysis system 500 shown in FIG. 5A and a dynamic log file analysis system 550 shown in FIG. 5B, include at least one processor 501, a hardware module, or a circuit for executing the functions of the described components which may be software units executing on the at least one processor. Multiple processors running parallel processing threads may be provided enabling parallel processing of some or all of the functions of the components. Memory 502 may be configured to provide computer instructions 503 to the at least one processor 501 to carry out the functionality of the components.

The systems 500, 550 for log file analysis generally include a comparing component 510 for comparing each line of a log file with other lines of the log file to determine duplicate and similar lines of the log file.

The comparing component 510 may include at least one processor and multiple parallel processing threads may be provided enabling parallel processing of the function of the comparing component 510 and its sub-components providing increased performance of this processing intensive aspect.

The comparing component 510 includes a duplicate locating component 511 for locating duplicate lines of the log file which match and a similar line locating component 512 for locating similar lines of the log file using pattern matching of the strings of the lines of the log file. A user configuration component 530 may be provided for configuring settings for the comparing component 510 according to current requirements.

An output component 520 is provided for outputting a line of a log file as a potential anomaly if it is not a duplicate or similar line. The output component 520 may be a user interface display, an event trigger component, or a report generating component.

In one embodiment shown in FIG. 5A, the system 500 is an existing log file analysis system and includes a log file input component 531 for inputting a log file 533 to a memory file in memory storage 532.

In this embodiment, the comparing component 510 compares the lines of the log file in memory 532 using an iterative method. The duplicate locating component 511 includes a duplicate eliminating component 541 for eliminating duplicated lines when the number of duplicated lines is above a threshold number. The similar line locating component 512 includes a similar line eliminating component 542 for eliminating similar lines when the number of similar lines is above a threshold number.

The output component 520 in this embodiment is for outputting a non-eliminated line of a log file as a potential anomaly outputs remaining lines of the log file when no more eliminations are made in the iterations of the method.

In another embodiment shown in FIG. 5B, the system 550 is a dynamic log file analysis system includes a reference bucket creating component 570 for creating a reference bucket 571 of a set of lines of a log file which is stored in memory storage 576, wherein the log file is being dynamically written. The log file is dynamically written storing currently written lines to a memory file in memory storage.

In this embodiment, the comparing component 510 compares a newly written line of the log file with the set of lines of the log file in the stored reference bucket 571.

A line adding component 572 may be provided for populating the reference bucket dynamically with duplicate and similar lines.

The line adding component 572 for populating the reference bucket dynamically with duplicate and similar lines includes: a count incrementing component 573 for incrementing a count in the reference bucket 571 for a duplicate or similar line entry; and a removing component 574 for, if the reference bucket 571 reaches a predefined size, removing and outputting as a potential anomaly a line having a lowest count if the count is below a threshold. The system 550 may include a user interface 575 for enabling user examination of the reference bucket 571.

In this embodiment, the output component 520 outputs potential anomalies as they occur by rejecting them from the reference bucket. The output component 520 may also, at the end of a log file feed, output remaining entries in the reference bucket 571 as potential anomalies.

These algorithms may be applied to log files in the form of any type of information feed, such as email messages, forum feeds and so forth. Allowing extraction of interesting items from the regular noise. Additional this can be incorporated into a security event detection system Given the example mentioned earlier of a ~9 million entry file, the described analysis runs in approximately 2.5 minutes and finds 234 unusual entries.

Figure 6:
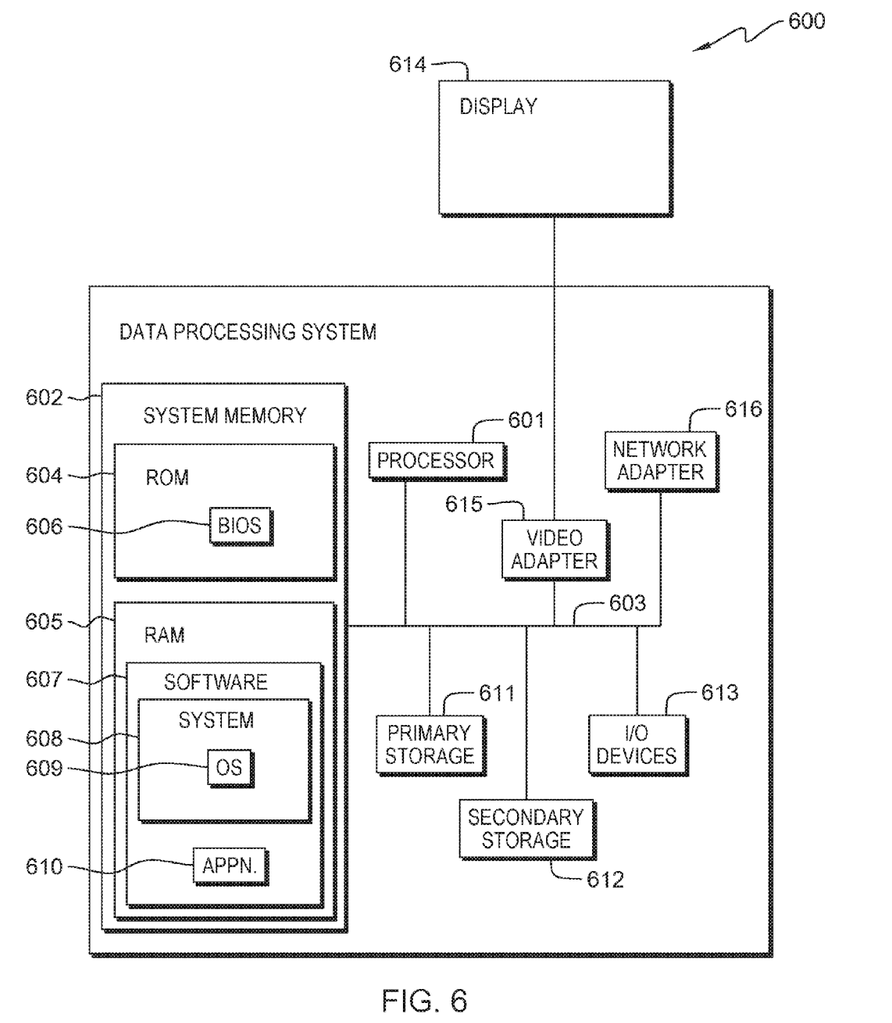
FIG. 6 is a block diagram of an embodiment of a computer system in which the present invention may be implemented.

Referring to FIG. 6, an exemplary system for implementing aspects of the invention includes a data processing system 600 suitable for storing and/or executing program code including at least one processor 601 coupled directly or indirectly to memory elements through a bus system 603. The memory elements may include local memory employed during actual execution of the program code, bulk storage, and cache memories which provide temporary storage of at least some program code in order to reduce the number of times code must be retrieved from bulk storage during execution.

The memory elements may include system memory 602 in the form of read only memory (ROM) 604 and random access memory (RAM) 605. A basic input/output system (BIOS) 606 may be stored in ROM 604. Software 607 may be stored in RAM 605 including system software 608 such as operating system software 609. Software applications 610 may also be stored in RAM 605.

The system 600 may also include a primary storage means 611 such as a magnetic hard disk drive and secondary storage means 612 such as a magnetic disc drive and an optical disc drive. The drives and their associated computer-readable media provide non-volatile storage of computer-executable instructions, data structures, program modules and other data for the system 600. Software applications may be stored on the primary and secondary storage means 611, 612 as well as the system memory 602.

The computing system 600 may operate in a networked environment using logical connections to one or more remote computers via a network adapter 616.

Input/output devices 613 may be coupled to the system either directly or through intervening I/O controllers. A user may enter commands and information into the system 600 through input devices such as a keyboard, pointing device, or other input devices (for example, microphone, joy stick, game pad, satellite dish, scanner, or the like). Output devices may include speakers, printers, etc. A display device 614 is also connected to system bus 603 via an interface, such as video adapter 615.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Improvements and modifications can be made to the foregoing without departing from the scope of the present invention.

What is claimed is:

1. A computer-implemented method for log file analysis to locate anomalies in a system log file stream of a server, wherein the server is associated with a cloud service, the method comprising:
   creating a reference bucket comprising a set of lines of a log file, wherein the log file is being dynamically written and is received from a live log feed, wherein the reference bucket comprises a configurable size to limit a number of the lines in the set of lines, and wherein duplicate lines and similar lines are stored in the reference bucket as an entry with an entry counter;
   comparing each line of the log file with other lines of the log file to determine duplicate and similar lines of the log file, including comparing a currently written line of the log file with the set of lines of the log file in the reference bucket, and further including:
   locating two or more duplicate lines of the log file;
   locating two or more similar lines of the log file using prefix and suffix pattern matching and Ratcliff-Obershelp pattern matching with respect to a string of each of the lines of the log file, wherein locating the two or more similar lines comprises calculating a similarity score based on twice the number of characters in the string that are found in common with respect to each of the lines, divided by the total number of characters in the lines;
   adding a currently written line which is one of a duplicate line and a similar line to the reference bucket dynamically, wherein a frequency of entry growth in the reference bucket is recorded to determine changes in logging patterns; and
   outputting a line of the log file as a line that is a potential anomaly if it is rejected as a duplicate or a similar line, including outputting a line that is a potential anomaly as it is written by rejecting the line from the reference bucket with respect to the system log file stream of the server associated with the cloud service.

2. The method as claimed in claim 1, further comprising:
   inputting the log file to a memory file;
   wherein comparing each line of the log file with other lines of the log file to determine duplicate and similar lines, includes sorting and comparing the lines of the log file in the memory file using an iterative method;
   wherein locating two or more duplicate lines of the log file, includes eliminating the duplicated lines from the memory file when a number of duplicated lines is above a first threshold number;
   wherein locating two or more similar lines of the log file using pattern matching of a string of each of the lines of the log file, includes eliminating the similar lines from the memory file when a number of the similar lines is above a second threshold number; and
   wherein outputting a line of a log file as a line that is a potential anomaly outputs remaining lines of the log file in the memory file when no more eliminations are made in the iterations of the iterative method.

3. The method as claimed in claim 1, wherein adding a currently written line which is one of a duplicate line and a similar line to the reference bucket dynamically includes:
   incrementing a count in the reference bucket for a duplicate or a similar line; and
   if the reference bucket reaches a predefined number of lines, removing and outputting as a potential anomaly a line having a lowest count if the count is below a threshold.

4. The method as claimed in claim 1, including, at the end of a log file feed, outputting remaining entries in the reference bucket as lines that are potential anomalies.

5. The method as claimed in claim 1, including enabling a user to view the reference bucket and manually rejecting a line from the reference bucket.

6. The method as claimed in claim 1, wherein comparing each line of a log file with other lines of the log file to determine duplicate and similar lines of the log file, includes using multiple parallel processing threads.

7. The method as claimed in claim 1, wherein locating two or more similar lines of the log file using pattern matching of a string of each of the lines of the log file includes excluding prefixes and/or suffixes from the matching of lines of the log file.

8. The method as claimed in claim 1, further comprising:
   configuring settings for the comparing step according to current requirements.

* * * * *